(12) United States Patent  
Silverbrook

(10) Patent No.: US 7,258,435 B2  
(45) Date of Patent: Aug. 21, 2007

(54) INKJET PRINTER WITH A MEDIA TRAY FOR SHEETS OF PRINT MEDIA AND AN INK CARTRIDGE

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 341 days.

(21) Appl. No.: 11/012,347

(22) Filed: Dec. 16, 2004

(65) Prior Publication Data

US 2005/0093945 A1    May 5, 2005

Related U.S. Application Data

(63) Continuation of application No. 10/202,021, filed on Jul. 25, 2002, now Pat. No. 7,036,918, which is a continuation of application No. 09/575,164, filed on May 23, 2000, now Pat. No. 6,428,155.

(30) Foreign Application Priority Data

May 25, 1999  (AU) .................................... PQ0559  
Jun. 30, 1999  (AU) .................................... PQ1313

(51) Int. Cl.  
*B41J 2/01*  (2006.01)  
(52) U.S. Cl. ..................................... 347/104  
(58) Field of Classification Search ................ 347/100, 347/85–87, 104, 109  
See application file for complete search history.

(56) References Cited

U.S. PATENT DOCUMENTS

| | | | |
|---|---|---|---|
| 3,953,862 A | 4/1976 | Amberntsson et al. | |
| 4,864,618 A | 9/1989 | Wright et al. | |
| 5,051,736 A | 9/1991 | Bennett et al. | |
| 5,236,265 A * | 8/1993 | Saito et al. | 400/88 |
| 5,414,262 A | 5/1995 | Filo | |
| 5,419,546 A | 5/1995 | Chen et al. | |
| 5,477,012 A | 12/1995 | Sekendur | |
| 5,542,971 A | 8/1996 | Auslander et al. | |
| 5,646,667 A * | 7/1997 | Broder et al. | 347/104 |

(Continued)

FOREIGN PATENT DOCUMENTS

| | | |
|---|---|---|
| EP | 0730250 | 9/1995 |
| EP | 0803368 A | 10/1997 |
| EP | 0953454 A | 11/1999 |
| GB | 2306669 | 5/1997 |
| GB | 2316682 | 3/1998 |
| JP | 08-244246 A | 1/1997 |
| WO | WO99/18487 | 4/1999 |
| WO | WO99/50787 | 10/1999 |

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

*Primary Examiner*—An H. Do

(57) ABSTRACT

An inkjet printer includes a chassis. A pagewidth printhead assembly is mounted on the chassis and defines a pagewidth printing zone through which sheets of print media are fed. A media tray is mounted on the chassis, upstream of the printhead assembly. The media tray includes a guide arrangement in which sheets of print media can be retained. An ink connector arrangement is positioned on the media tray to permit an ink cartridge to be engaged with the printer adjacent the guide arrangement. A feed means is mounted on the chassis, interposed between the media tray and the printhead assembly and configured to feed sheets of print media through the printing zone.

6 Claims, 20 Drawing Sheets

U.S. PATENT DOCUMENTS

| | | |
|---|---|---|
| 5,652,412 A | 7/1997 | Lazzouni |
| 5,661,506 A | 8/1997 | Lazzouni et al. |
| 5,692,073 A | 11/1997 | Cass |
| 5,815,174 A | 9/1998 | Stone |
| 5,852,434 A | 12/1998 | Sekendur |
| 5,870,124 A * | 2/1999 | Silverbrook .................. 347/85 |
| 5,995,193 A | 11/1999 | Stephany et al. |
| 6,059,406 A * | 5/2000 | Richtsmeier et al. ....... 347/102 |
| 6,074,050 A | 6/2000 | Perez et al. |
| 6,076,734 A | 6/2000 | Dougherty |
| 6,106,110 A | 8/2000 | Gundjian et al. |
| 6,106,112 A | 8/2000 | Okubo et al. |
| 6,137,512 A | 10/2000 | Higuma et al. |
| 6,238,115 B1 * | 5/2001 | Silverbrook et al. ........ 400/693 |
| 6,290,343 B1 | 9/2001 | Lewis et al. |
| 6,336,704 B1 | 1/2002 | Shimada |
| 6,457,793 B1 | 10/2002 | Su |
| 6,964,374 B1 | 11/2005 | Djuknic et al. |

* cited by examiner

INKJET PRINTER WITH A MEDIA TRAY FOR SHEETS OF PRINT MEDIA AND AN INK CARTRIDGE

CROSS-REFERENCE TO RELATED APPLICATIONS

This Application is a Continuation of U.S. Ser. No. 10/202,021 filed on Jul. 25, 2002, now issued U.S. Pat. No. 7,036,918, which is a continuation of U.S. Ser. No. 09/575,164, filed on May 23, 2000, now issued U.S Pat. No. 6,428,155 all of which are herein incorporated by reference

FIELD OF THE INVENTION

The present invention relates to ink jet printers and in particular, consumable cartridges for ink jet printers.

CO-PENDING APPLICATIONS

Various methods, systems and apparatus relating to the present invention are disclosed in the following co-pending applications/granted patents filed by the applicant or assignee of the present invention with the present application:

| | | | | | |
|---|---|---|---|---|---|
| 6428133 | 6526658 | 6315399 | 6338548 | 6540319 | 6328431 |
| 6328425 | 6991320 | 6383833 | 6464332 | 6439693 | 6390591 |
| 7018016 | 6328417 | 09/575197 | 7079712 | 09/575123 | 6825945 |
| 09/575165 | 6813039 | 6987506 | 7038797 | 6980318 | 6816274 |
| 7102772 | 09/575186 | 6681045 | 6728000 | 7173722 | 7088459 |
| 09/575181 | 7068382 | 7062651 | 6789194 | 6789191 | 6644642 |
| 6502614 | 6622999 | 6669385 | 6549935 | 6987573 | 6727996 |
| 6591884 | 6439706 | 6760119 | 09/575198 | 6290349 | 6428155 |
| 6785016 | 6870966 | 6822639 | 6737591 | 7055739 | 09/575129 |
| 6830196 | 6832717 | 6957768 | 09/575162 | 09/575172 | 7170499 |
| 710688 | 7123239 | 6409323 | 6281912 | 6604810 | 6318920 |
| 6488422 | 6795215 | 7154638 | 6859289 | | |

The disclosures of these co-pending applications are incorporated herein by cross-reference.

BACKGROUND OF THE INVENTION

With the advent of the Internet has come the opportunity for the print media industry to publish "on-line" rather than producing and distributing traditional paper based publications. On-line publishing has a number of advantages. From the consumer's point of view, information is available on demand, information can be navigated via hypertext links, information can be searched, and information can be automatically personalized. From the publisher's point of view, the costs of printing and physical distribution are eliminated and the publication becomes more attractive to advertisers as it can be targeted to specific demographics and linked to product sites.

On-line publication also has disadvantages. Computer screens are inferior to paper. At the same quality as a magazine page, a SVGA computer screen displays only about a fifth as much information. Both CRT's (Cathode Ray Tubes) and LCD's (Liquid Crystal Displays) have brightness and contrast problems, particularly, when ambient light is strong. Ink on paper, being reflective rather than emissive is both bright and sharp in ambient light. Accordingly, people have a natural preference to read newspapers, magazines, catalogues, brochures and other publications in a bound paper based format.

Printers that incorporate a binding means may be connected to the Internet for the on-line publication of the bound documents. However, if the paper based document is to be interactive in the same manner as a Web page, then the page will need to carry information in a form that can be read by an optical reader linked to the network. If this information is printed in a colorant that is visible to the human eye, then it is likely to obscure text or images printed on the page. Accordingly, the information to be read by the optical reader is printed in a colorant that is invisible to the human eye but visible to the optical reader device used.

The invisible colorant is an additional consumable that must be supplied to the printer. This adds to the number of interruptions to printer operation because of the need to periodically replenish each of the consumable materials as they deplete.

SUMMARY OF THE INVENTION

It is an object of the present invention to reduce the interruptions to a printers operation caused by the depletion of material consumed by the printer. Accordingly, the present invention provides a cartridge for a digital printer adapted to print information onto a media substrate in a form that can be read by the human eye and a form that is invisible to the human eye but readable to an optical reader device, the cartridge including:

a housing defining a plurality of storage areas wherein at least one of the storage areas contains colorant for printing information that is visible to the human eye and at least one of the other storage areas contains colorant for printing information in a form that is invisible to the human eye but readable by the optical reader device.

Preferably the colorant for printing information in a form that is invisible to the human eye but readable by the optical reader device is infrared ink.

In some preferred forms, the cartridge has a storage area for black ink.

In further preferred forms, the cartridge further includes storage areas for cyan, magenta, yellow and black ink. In still further preferred forms the cartridge also provides a storage area for fixative to reduce the drying time of the ink. Preferably, each storage area is sized corresponding to expected levels of use of its contents relative to the intended print coverage for a number of printed pages.

In some embodiments the housing includes a thin walled casing adapted for engagement with a cover at its open end; and, the storage areas are bladders wherein a separate bladder is provided for the adhesive and each different type of colorant used.

In a particularly preferred form the bladders have discharge nozzles and are adapted to be suspended from one end of the cup such that, in use, the colorant and adhesive are fed to the nozzles. Preferably the bladders are provided with means for suspending them from a pin extending through the cup adjacent the blind end. In a further preferred form the cover includes means to position the nozzles for engagement with corresponding ports in the printer.

In some preferred embodiments, the cartridge is formed from recyclable materials.

It will be appreciated that by providing a cartridge in accordance with the present invention, the 'invisible' colorant is replenished together with the 'usual' colorants thereby reducing how frequently the printer operation is interrupted because of the depletion of a consumable material. The invention has many applications in on-line publication of newspapers, magazines, brochures and so on. The present invention will be described with particular reference to the Applicant's netpage system. An overview of this system is set out below. It has been developed to allow a large number of distributed users to interact with networked information via printed matter and optical sensors thereby to obtain interactive printed matter on demand from high-speed networked color printers.

For this purpose, the Applicant has developed a range of netpage printers. Of these, the wallprinter is designed to be wall mounted in the area where the user would normally first consume the morning news such as in the kitchen or beside the breakfast table. In light of this, it is expected that the wallprinter will be one of the most widely used of the netpage printers and therefore it will be described in detail below to illustrate one specific embodiment of the invention. However, it will be appreciated that this is merely one example of the invention, which may be embodied in many other forms.

DETAILED DESCRIPTION OF PREFERRED AND OTHER EMBODIMENTS

Figure 1:
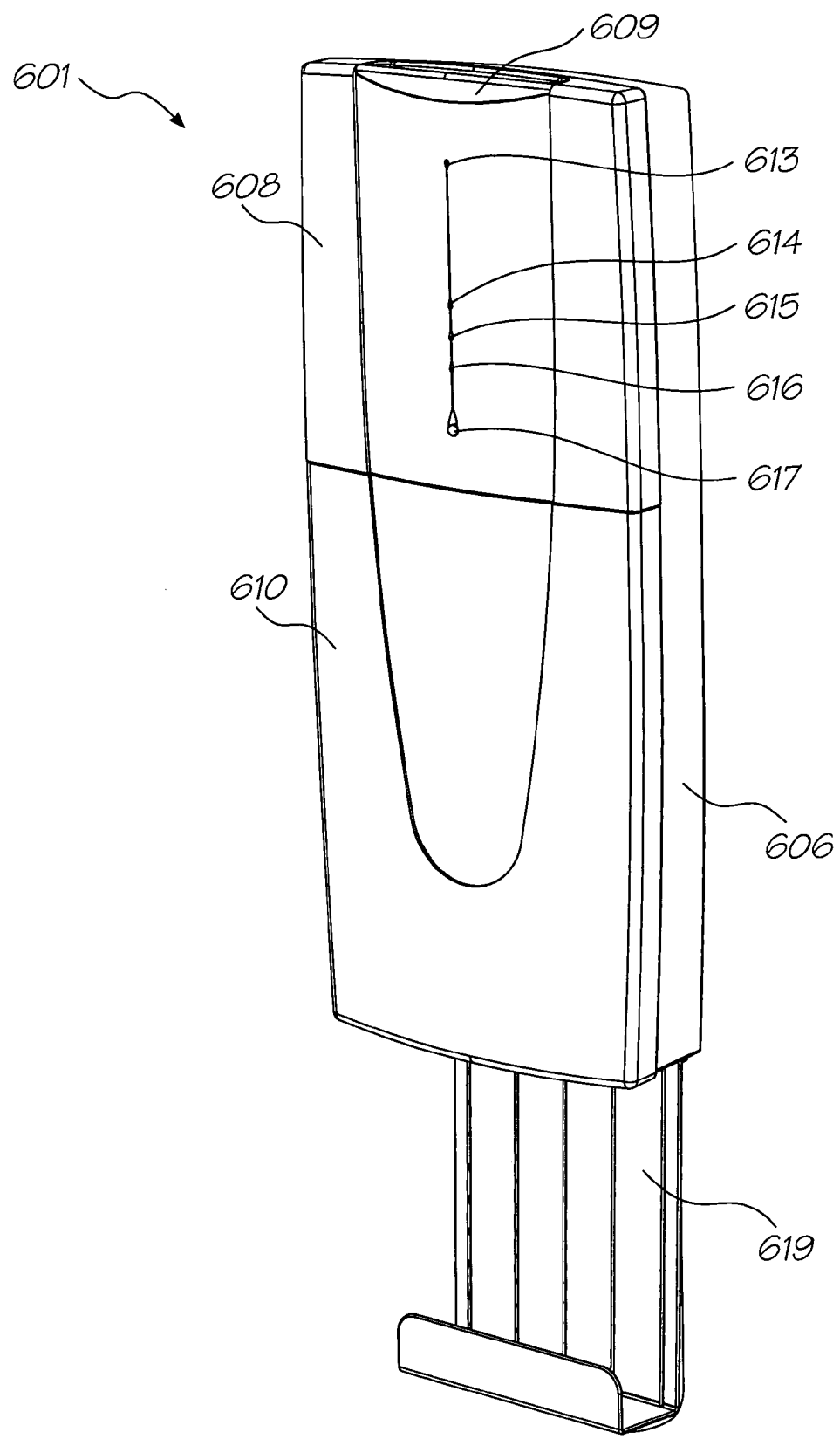
FIG. 1 shows a front three-quarter view of the wallprinter.

Note: Memjet™ is the trade mark of Silverbrook Research Pty Ltd, Australia.

In the preferred embodiment, the invention is configured to work with the netpage system, an overview of which follows. The system is described in this specification to reduce the need for external reference when attempting to understand the context in which the preferred embodiments and aspects of the present invention operate.

In its preferred form, the netpage system relies on the production of, and human interaction with, netpages. These are pages of text, graphics and images printed on ordinary paper, but which work like interactive Web pages. Information is encoded on each page using ink, which is substantially invisible to the unaided human eye. The ink, however, and thereby the encoded information, can be sensed by an optically imaging pen (the netpage pen) and transmitted to the netpage system.

In the preferred form, active buttons and hyperlinks on each page can be clicked with the netpage pen to request information from the network or to signal preferences to a network server. In one embodiment, text written by hand on a netpage is automatically recognized via the pen, allowing forms to be filled in. In other embodiments, signatures recorded on a netpage are automatically verified, allowing e-commerce transactions to be securely authorized.

The netpage pen works in conjunction with a netpage printer, an Internet-connected printing appliance for home, office or mobile use. The pen is wireless and communicates securely with the netpage printer via a short-range radio link.

The netpage printer delivers, periodically or on demand, personalized newspapers, magazines, catalogs, brochures and other publications, all printed at high quality as interactive netpages. Unlike a personal computer, the netpage printer is an appliance which can be, for example, wall-mounted adjacent an area where the morning news is first consumed, such as in a user's kitchen, near a breakfast table, or at the household's point of departure for the day. It also comes in tabletop, desktop, portable and miniature versions.

Netpages printed at their point of consumption combine the ease-of-use of paper with the timeliness and interactivity of an interactive medium.

The netpage system is made considerably more convenient because of the functional superiority of the netpage printers. At the heart of these printers are high-speed microelectromechanical system (MEMS) based inkjet (Memjet™) printheads described in various co-pending and co-filed applications from the list above. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

A netpage printer prints pages of photographic-quality images and magazine quality text at a rate of over 30 double sided sheets per minute (that is, more than 60 pages per minute). They come in a variety of forms, including wall-mounted versions, tabletop versions, portable versions, and pocket versions. Given the nature of the netpage system, it is envisaged that one of the most commercially relevant forms of netpage printer will be the wall mounted version referred to as wallprinter. For convenience, the present invention will be described in detail with reference to this specific version shown in the accompanying drawings.

Figure 2:
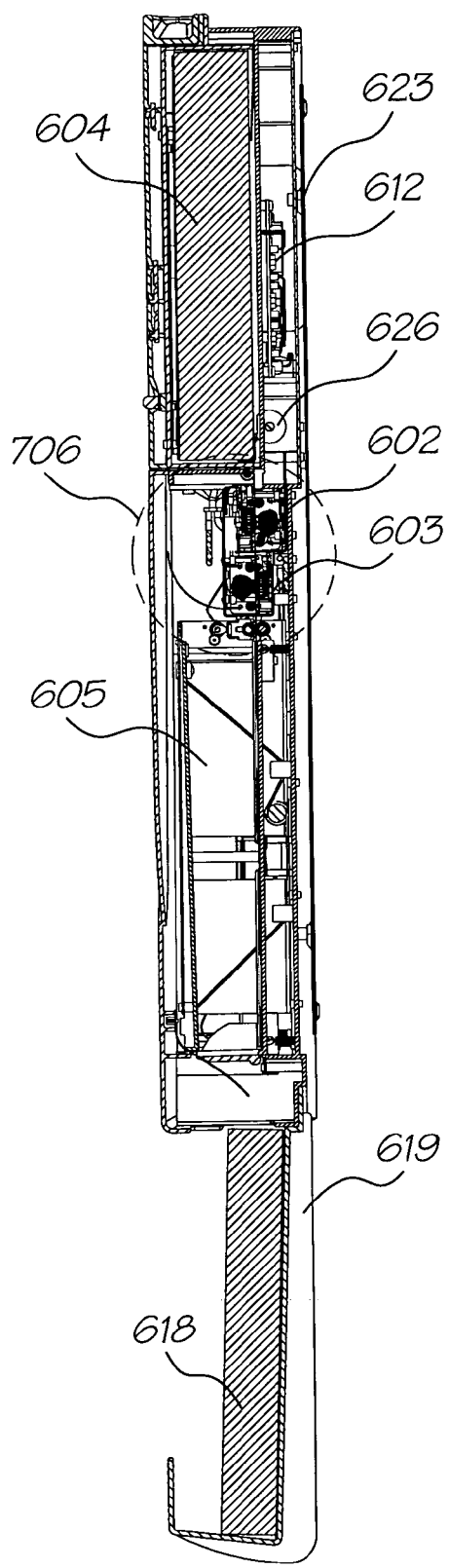
FIG. 2 shows a section through the length of the wallprinter.
Figure 2A:
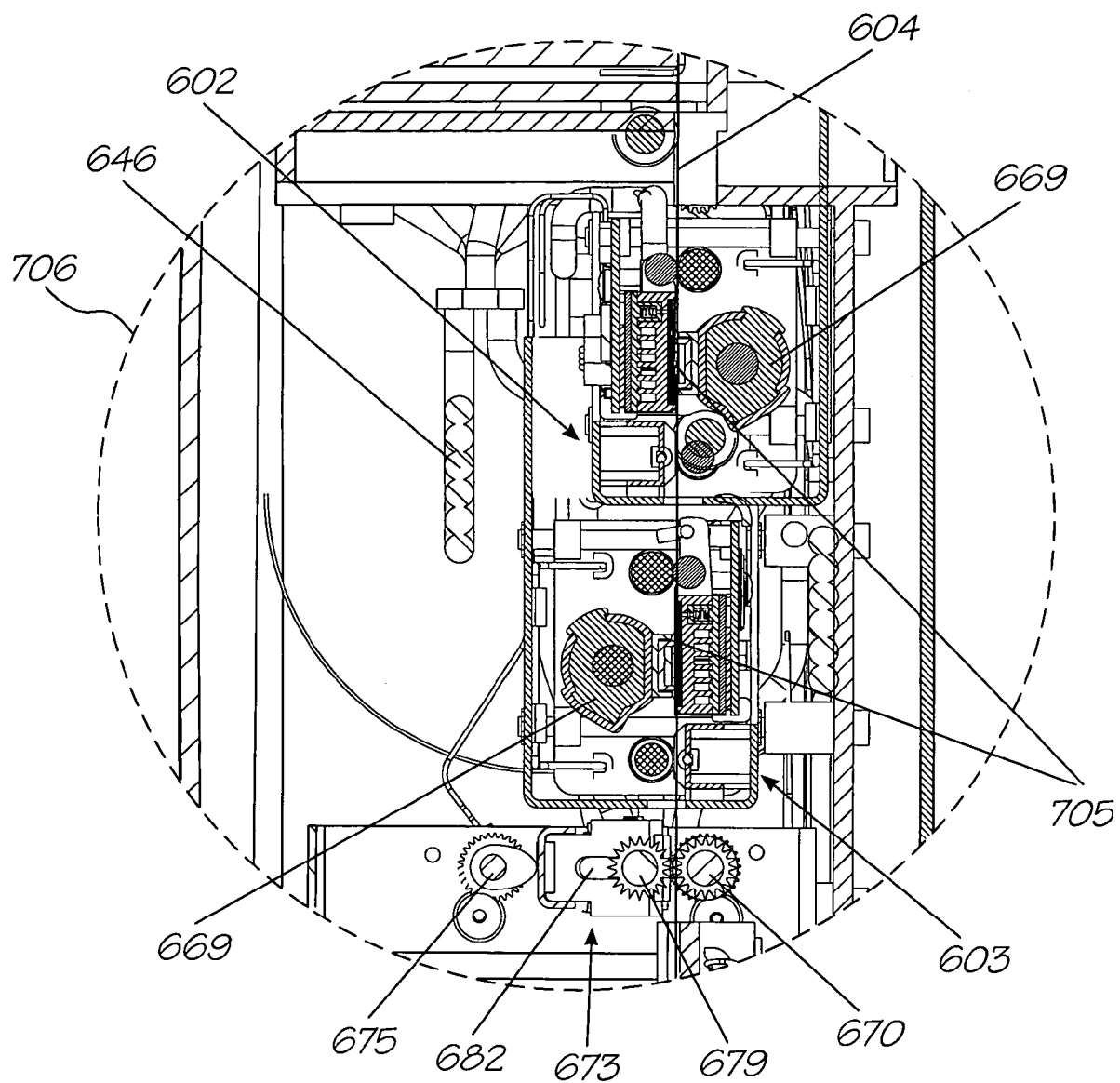
FIG. 2a is an enlarged portion of FIG. 2 showing a section of the duplexed print engines.
Figure 3:
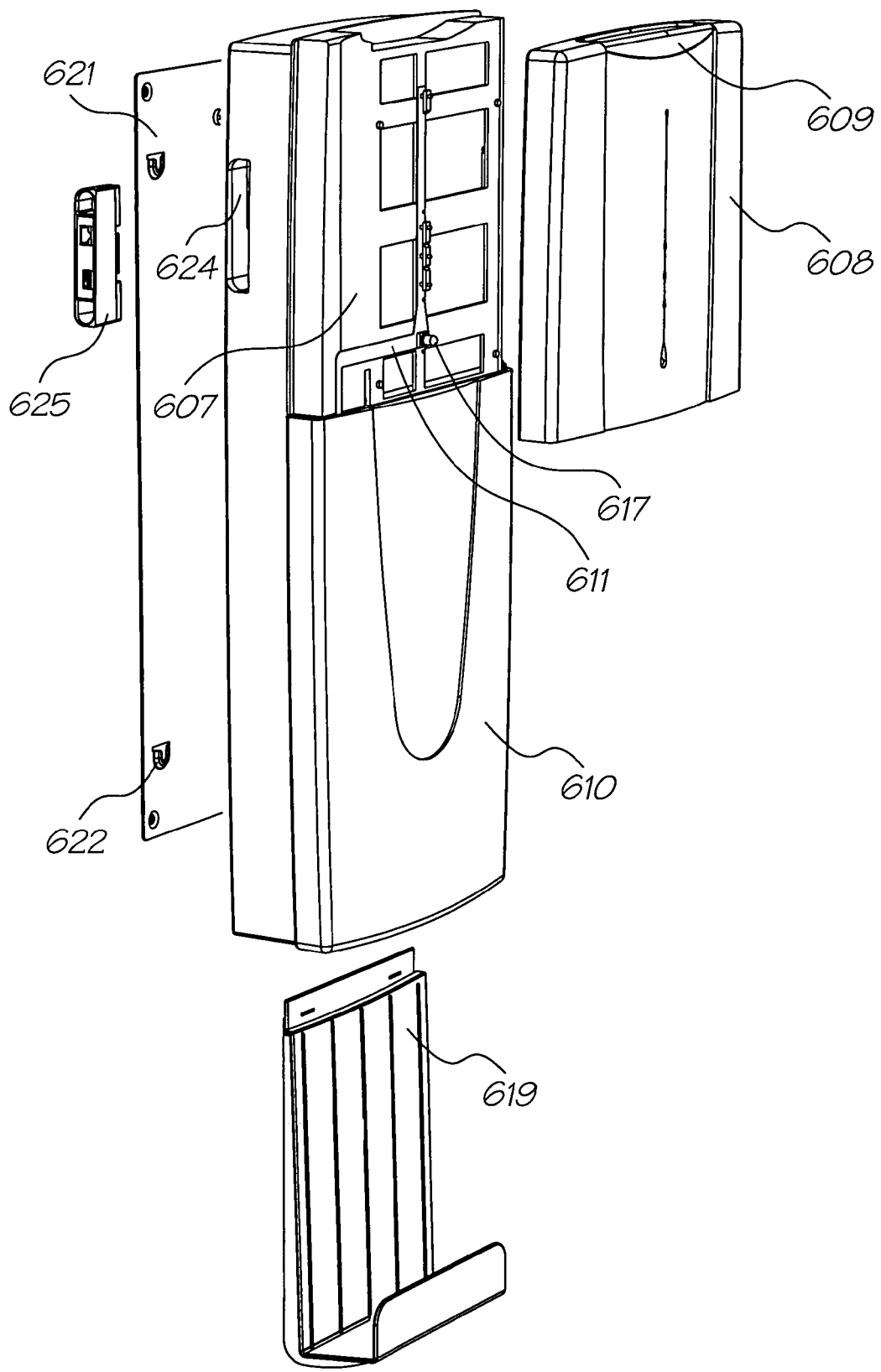
FIG. 3 shows a simple exploded view of the wallprinter.
Figure 19:
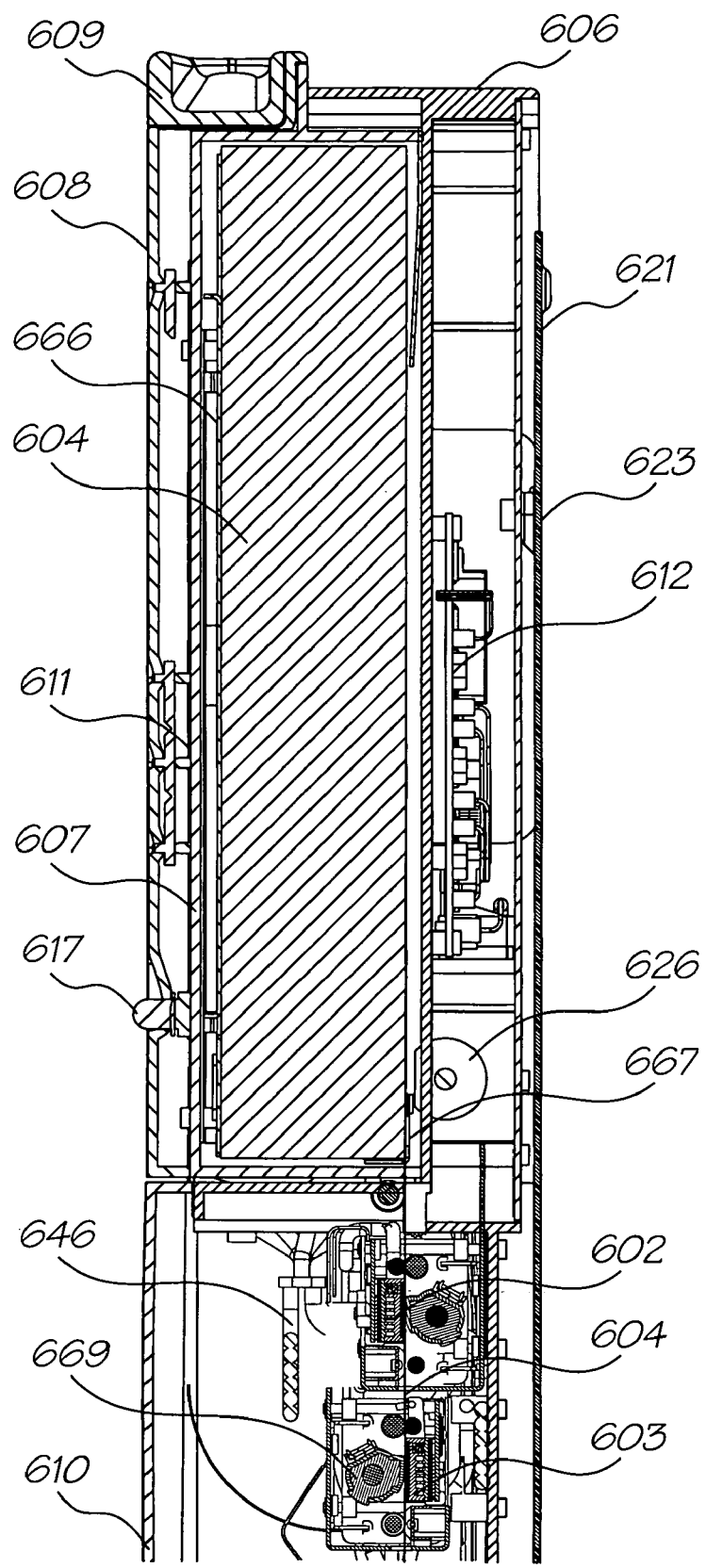
FIG. 19 shows a section through the top part of the printer.

The vertically-mounted netpage wallprinter 601 is shown fully assembled in FIGS. 1 and 2. As best shown in FIGS. 2, 2a and 19, it prints Netpages on A4 sized media using duplexed 8½" Memjet™ print engines 602 and 603. It uses a straight paper path with the paper 604 passing through duplexed print engines 602 and 603 which print both sides of a sheet simultaneously, in full color and with full bleed. A multi-DSP raster image processor (RIP) rasterizes pages to internal memory, and a pair of custom print engine controllers expand, dither and print page images to the duplexed printheads in real time.

Figure 14:
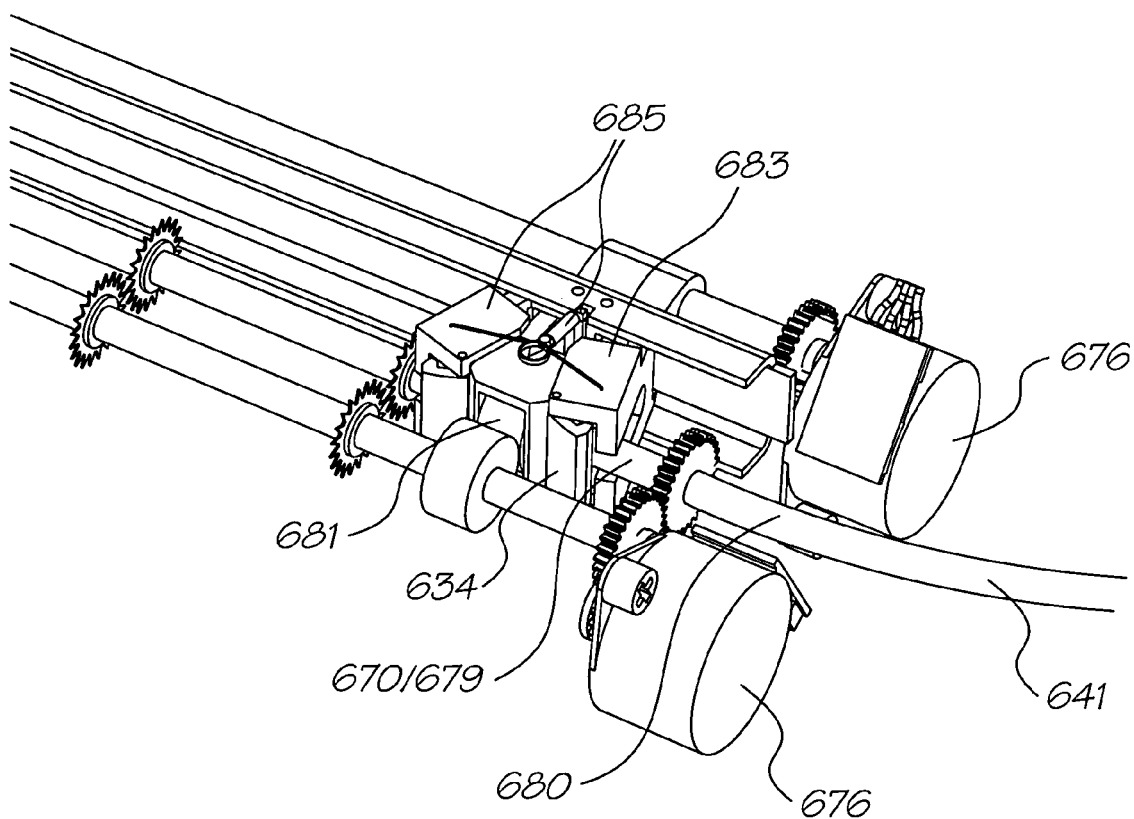
FIG. 14 shows a rear three-quarter view of the open glue wheel assembly.
Figure 15:
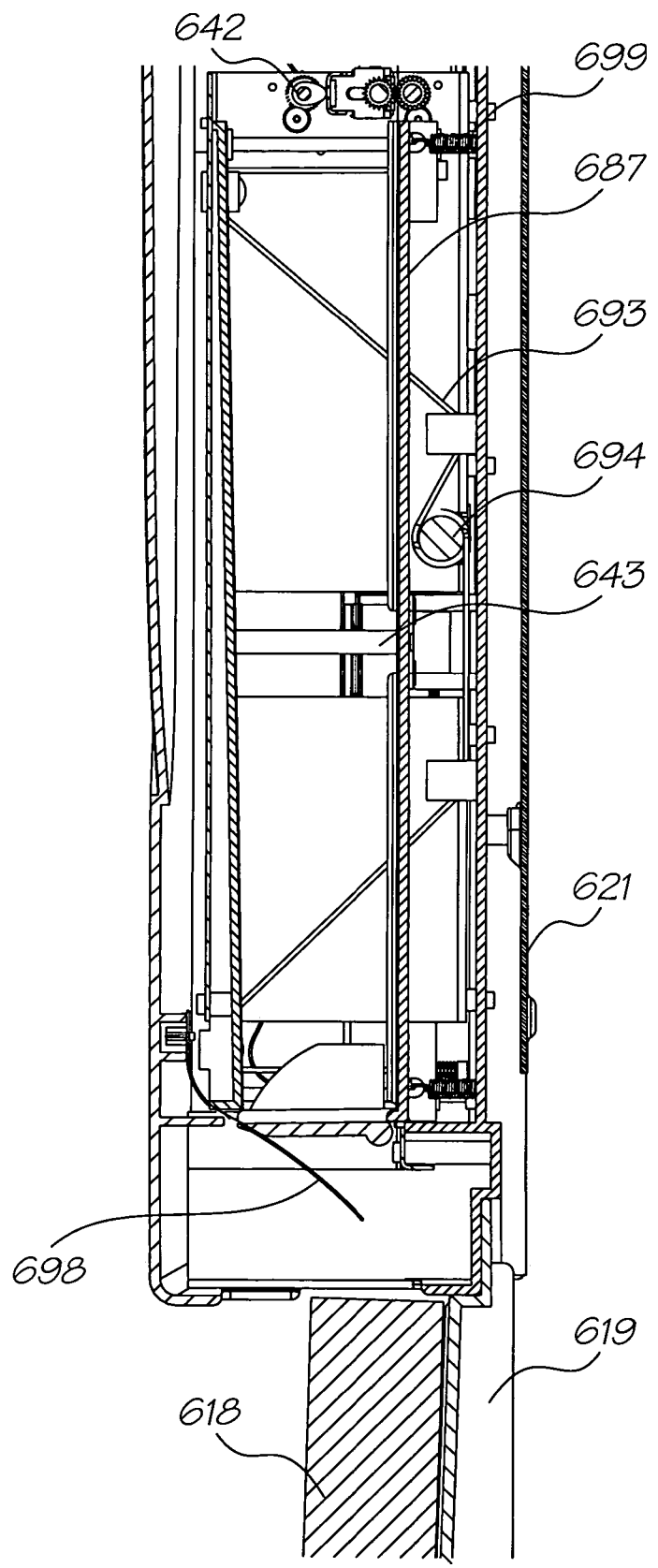
FIG. 15 shows a section through the binding assembly and the exit hatch.

An integral binding assembly 605 applies a strip of glue along one edge of each printed sheet, allowing it to adhere to the previous sheet when pressed against it. This creates a final bound document 618 which can range in thickness from one sheet to several hundred sheets. The binding assembly will be considered in close detail below with particular reference to FIGS. 13, 14 and 15.

Figure 8:
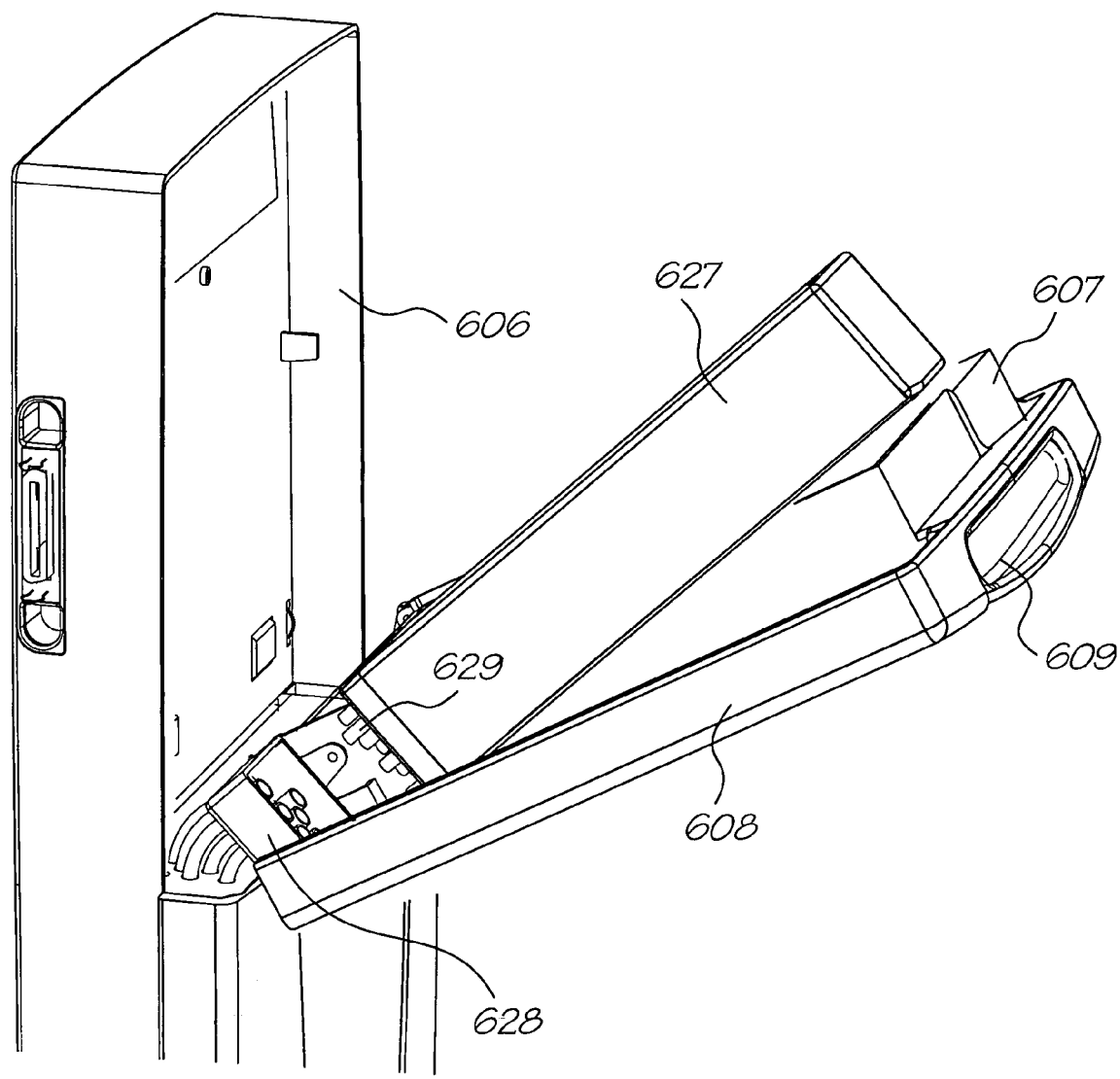
FIG. 8 shows a front three-quarter view of the open media tray.

Referring to FIGS. 1 to 9, the wallprinter 600 consists of a main chassis 606, which accommodates all major components and assemblies. As best shown in FIG. 8, it has a pivoting media tray 607 on the front upper portion, which is covered by a front molding 608 and handle molding 609. The front molding 608, handle molding 609 and lower front molding 610 can vary in color, texture and finish to make the product more appealing to consumers. They simply clip onto the front of the wallprinter 600.

Figure 10:
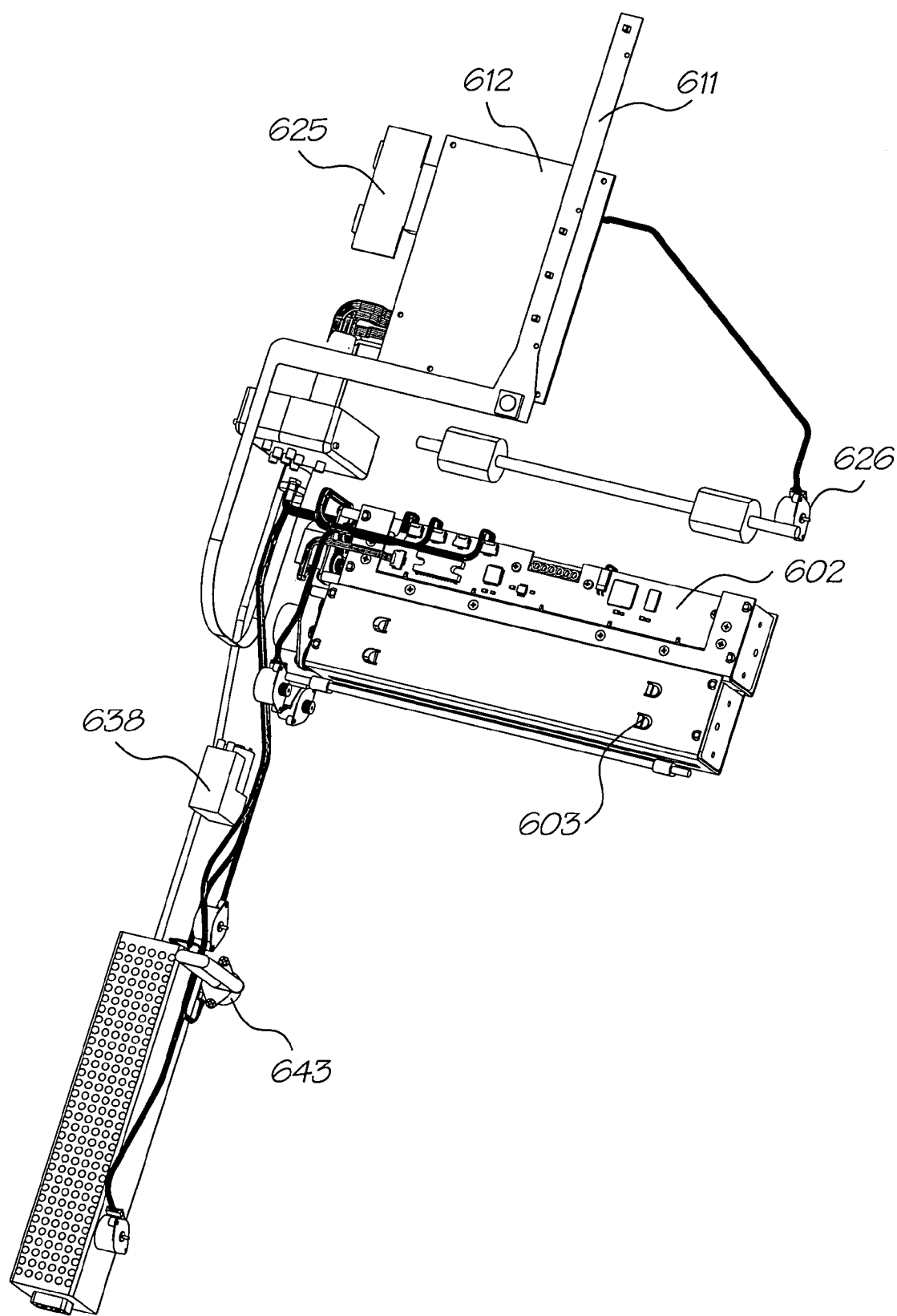
FIG. 10 shows a front three-quarter view of the electrical system of the printer.
Figure 11:
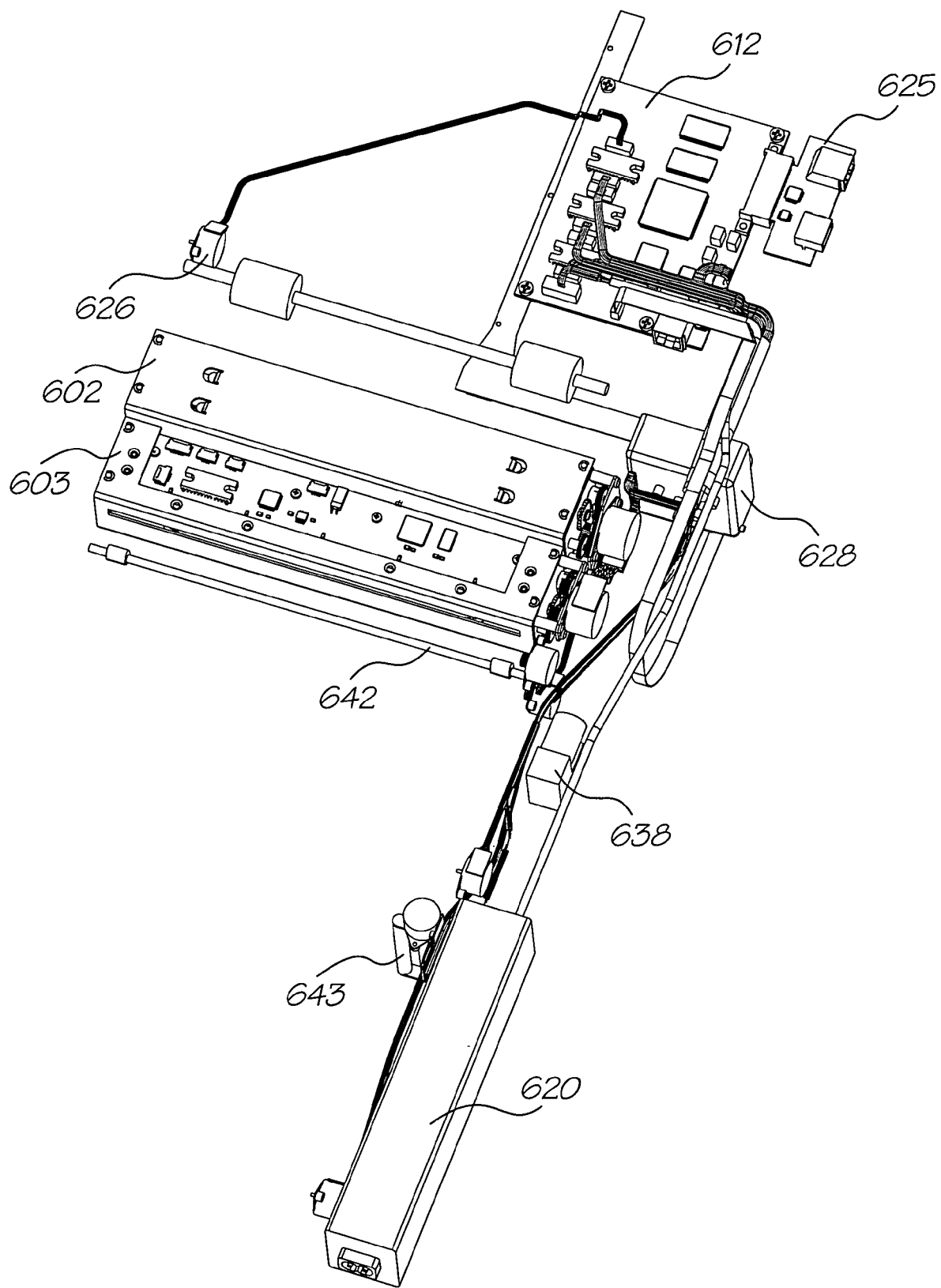
FIG. 11 shows a rear three-quarter view of the electrical system.
Figure 12:
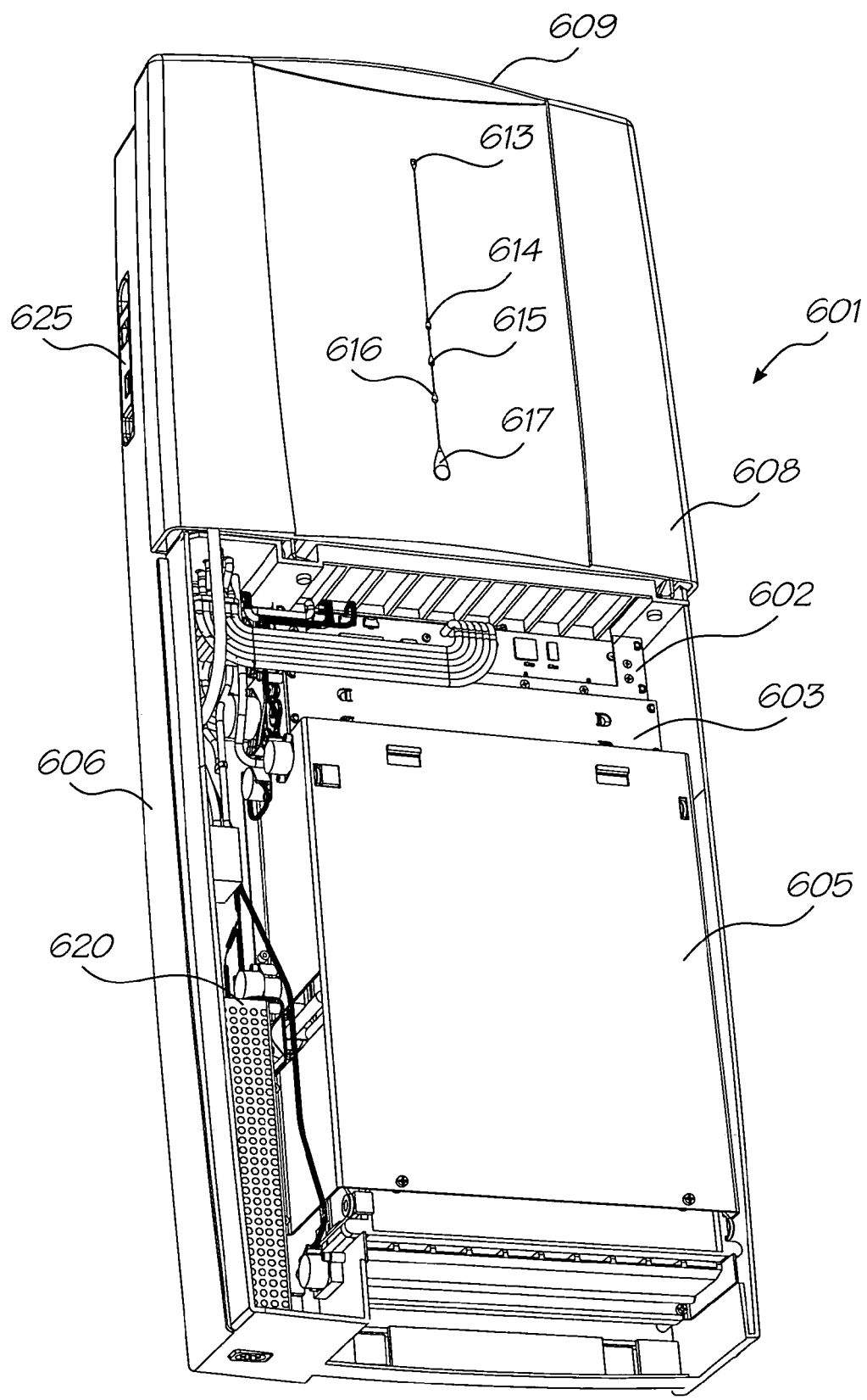
FIG. 12 shows a front three-quarter view of the wallprinter with the lower front cover removed.

FIGS. 10 and 11 show the wallprinter electrical system in isolation. A flexible printed circuit board (flex PCB) 611 runs from the media tray 607 to the main PCB 612. It includes four different color LEDs 613, 614, 615 and 616 and a push button 617. The LEDs show through the front molding and indicate "on" 613, "ink out" 614, "paper out" 615, and "error" 616. The push button 617 elicits printed "help" in the form of usage instructions, printer and consumable status information, and a directory of resources on the netpage network.

Printed, bound documents 618 exit through the base of the wallprinter 600 into a clear, plastic, removable collection tray 619. This is discussed in greater detail below with specific reference to FIG. 15.

The wallprinter 600 is powered by an internal 110V/220V power supply 620 and has a metal mounting plate 621 that is secured to a wall or stable vertical surface by four screws. Plunged keyhole slot details 622 in the metal plate 621 allow for four spigots mounted on the rear of the printer to hook onto the plate. As best shown in FIGS. 2 and 19, the wallprinter 600 is prevented from being lifted off by a screw, which locates the chassis molding 606 to the plate 621 at one position behind the media tray 607.

Figure 16:
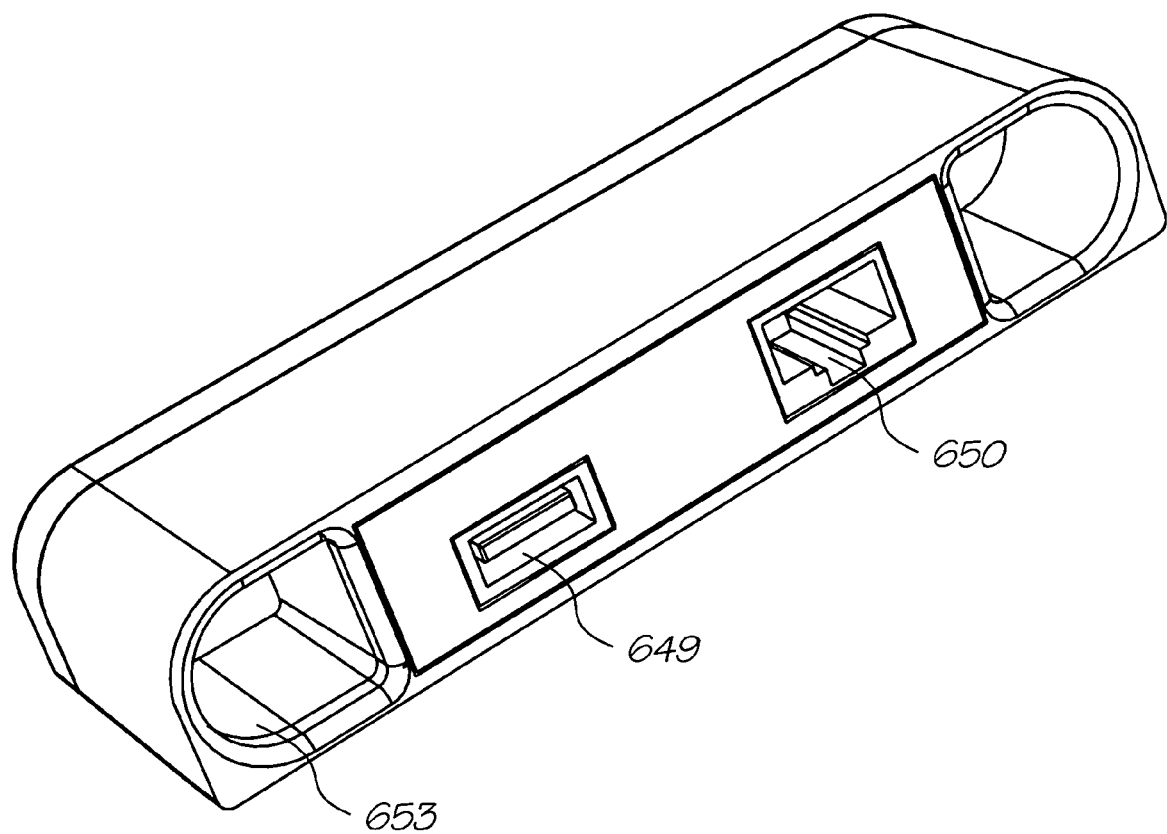
FIG. 16 shows a three-dimensional view of an interface module.
Figure 17:
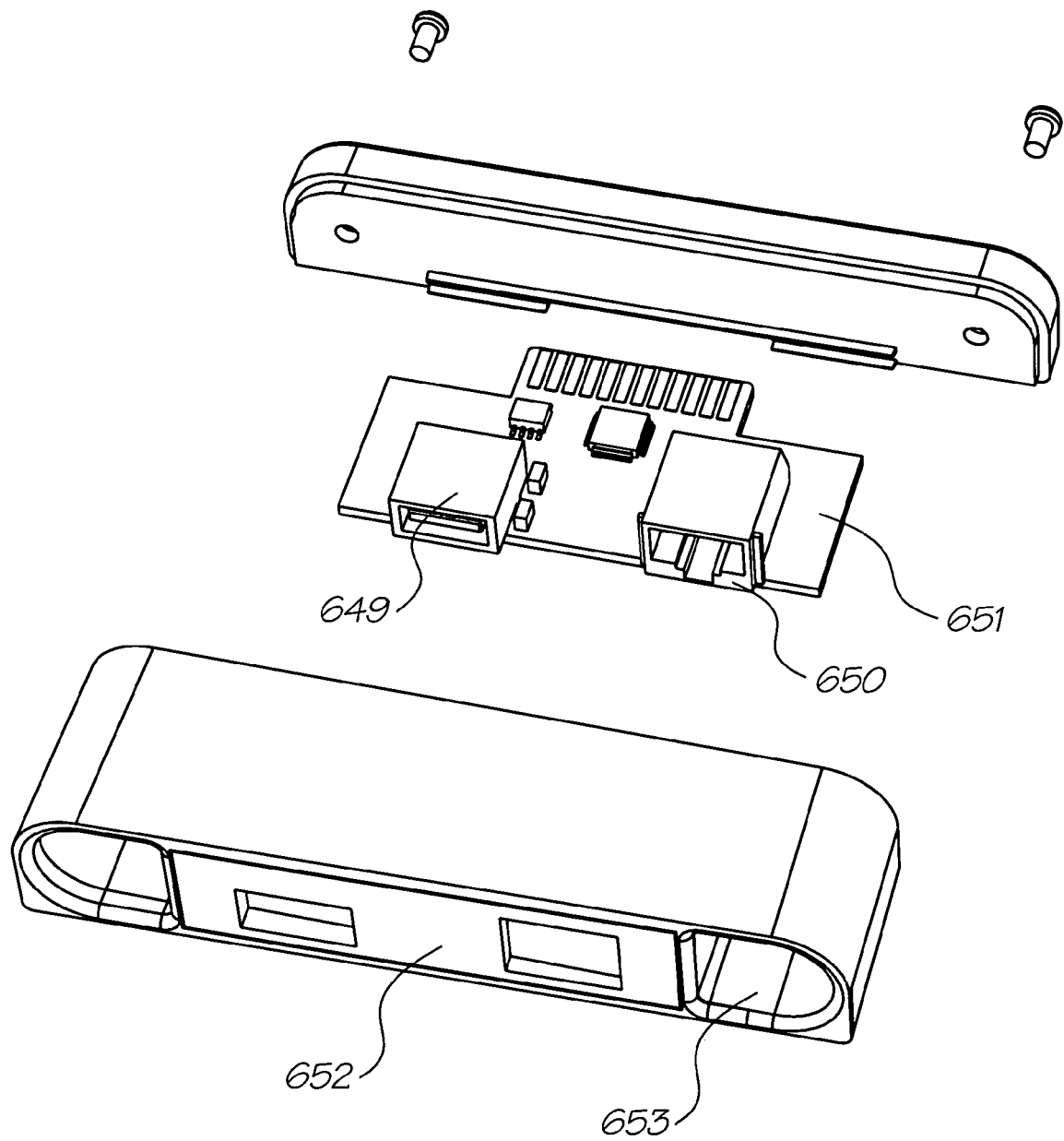
FIG. 17 shows an exploded view of an interface module.

Referring to FIGS. 16 and 17, the side of the wallprinter 600 includes a module bay 624 which accommodates a network interface module 625 which allows the printer to be connected to the netpage network and to a local computer or network. The interface module 625 can be selected and installed in the factory or in the field to provide the interfaces required by the user. The modules may have common connector options, such as: IEEE 1394 (Firewire) connection, standard Centronics printer port connection or a combined USB2 649 and Ethernet 650 connection. This allows the consumer to connect the wallprinter 600 to a computer or use it as a network printer. FIG. 17 shows the exploded assembly of the module 625. The interface module PCB 651, (with gold contact edge strips) plugs directly into the main wallprinter PCB 612 via an edge connector 654. The different connector configurations are accommodated in the module design by use of a tool insert 652. Finger recesses 653 on either side of the module 625 allow for easy manual insertion or removal.

Turning to FIG. 19, the main PCB 612 is attached to the rear of the chassis 606. The board 612 interfaces through the chassis molding 606 to the interface module 625. The PCB 612 also carries the necessary peripheral electronics for the Memjet™ printheads 705. This includes a main CPU with two 32 MB DRAMs, flash memory, IEEE 1394 interface chip, six motor controllers, various sensor connectors, interface module PCB edge connector, power management, internal/external data connectors and a QA chip.

Figure 18:
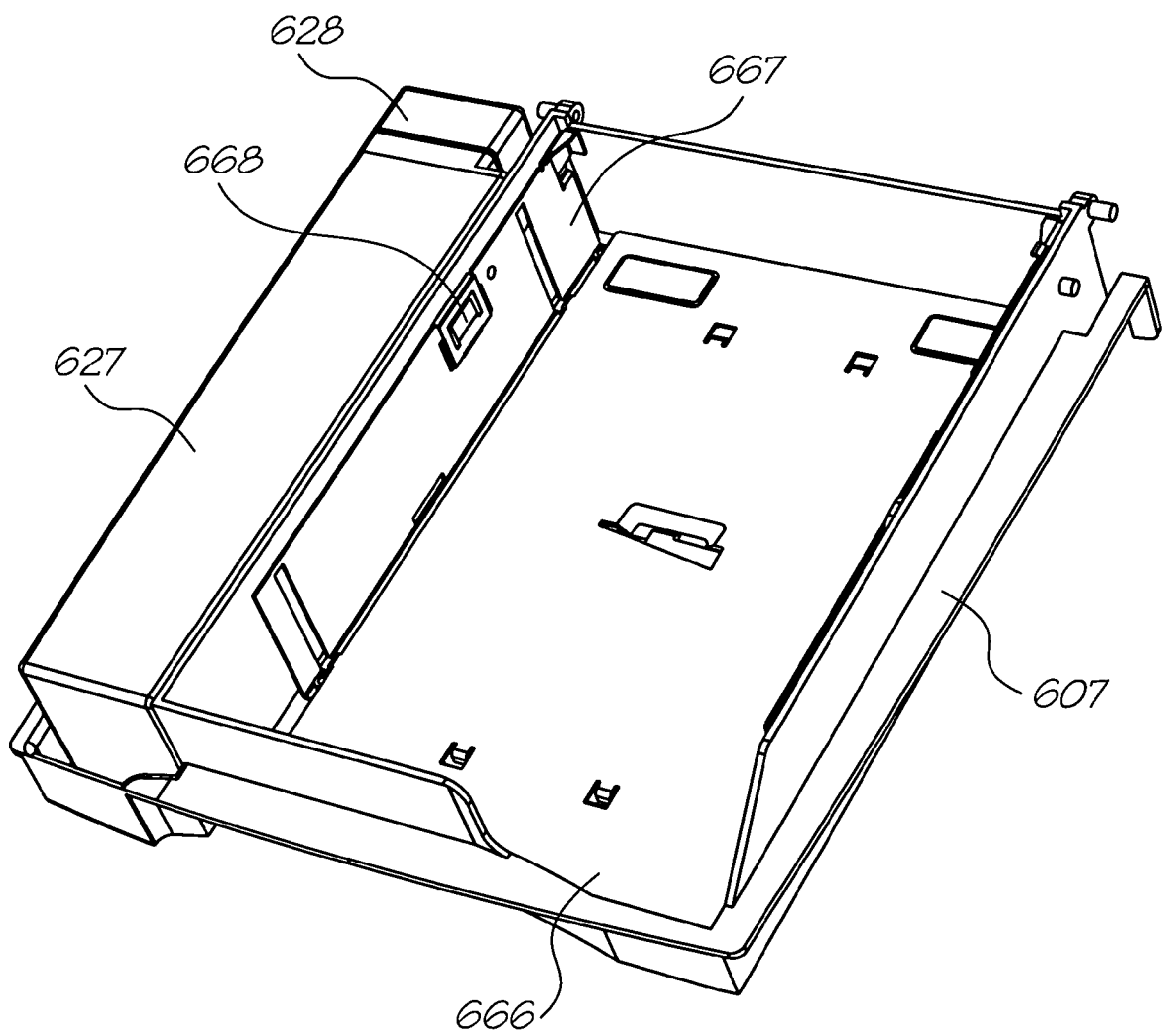
FIG. 18 shows a top three-quarter view of the media tray.

FIG. 8 shows the front hatch access to the paper 604 and the ink cartridge 627. Referring to FIG. 18, paper 604 is placed into a hinged top tray 607 and pressed down onto a sprung platen 666. The tray 607 is mounted to the chassis 606 via hinges 700. Each hinge has a base, a hinge lever and a hinge side. Pivots on the base and paper/media tray 607 engage the lever and side such that the paper/media tray 607 rotates in a manner that avoids kinking the supply hoses 646.

The paper 604 is positioned under edge guides 667 before being closed and is automatically registered to one side of the tray 607 by action of a metal spring part 668. An ink cartridge 627 connects into a pivoting ink connector molding 628 via a series of self-sealing connectors 629. The connectors 629 transmit ink, air and glue to their separate locations. The ink connector molding 628 contains a sensor, which detects a QA chip on the ink cartridge and verifies identification prior to printing. When the front hatch is sensed closed, a release mechanism allows the sprung platen 666 to push the paper 604 against a motorized media pick-up roller assembly 626.

Figure 4:
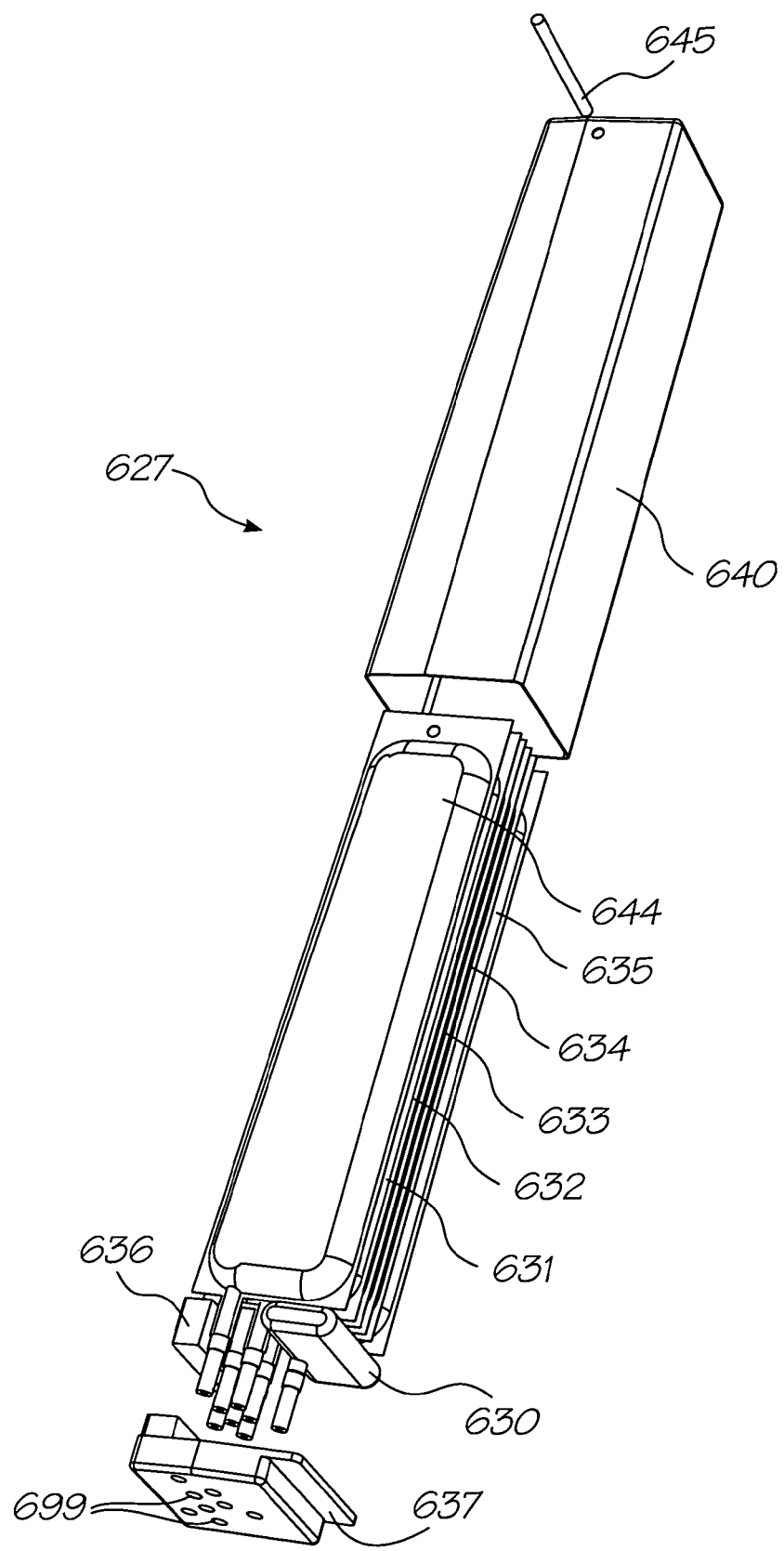
FIG. 4 shows an exploded view of the ink cartridge.
Figure 5:
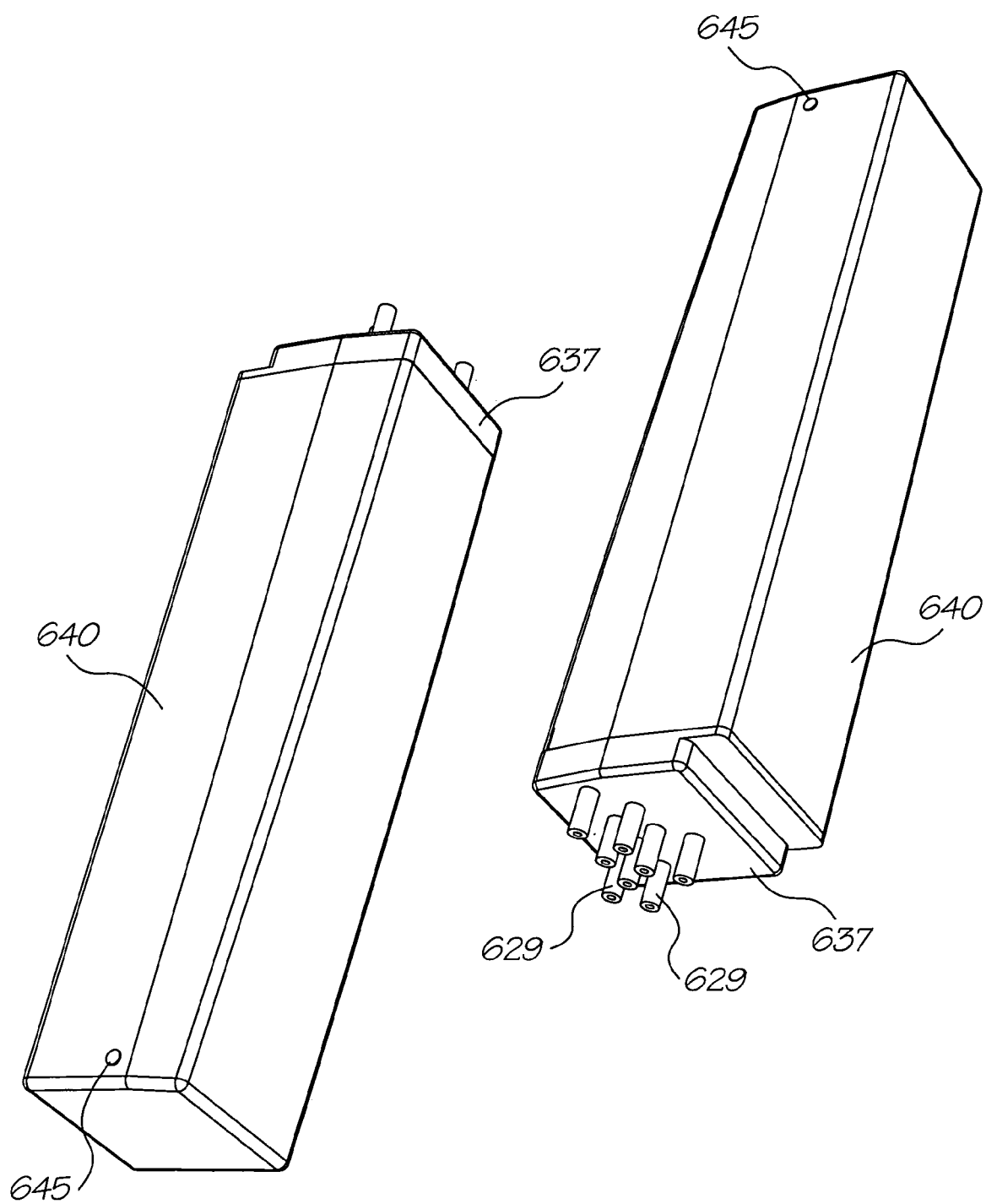
FIG. 5 shows three-quarter views of the ink cartridge.
Figure 6:
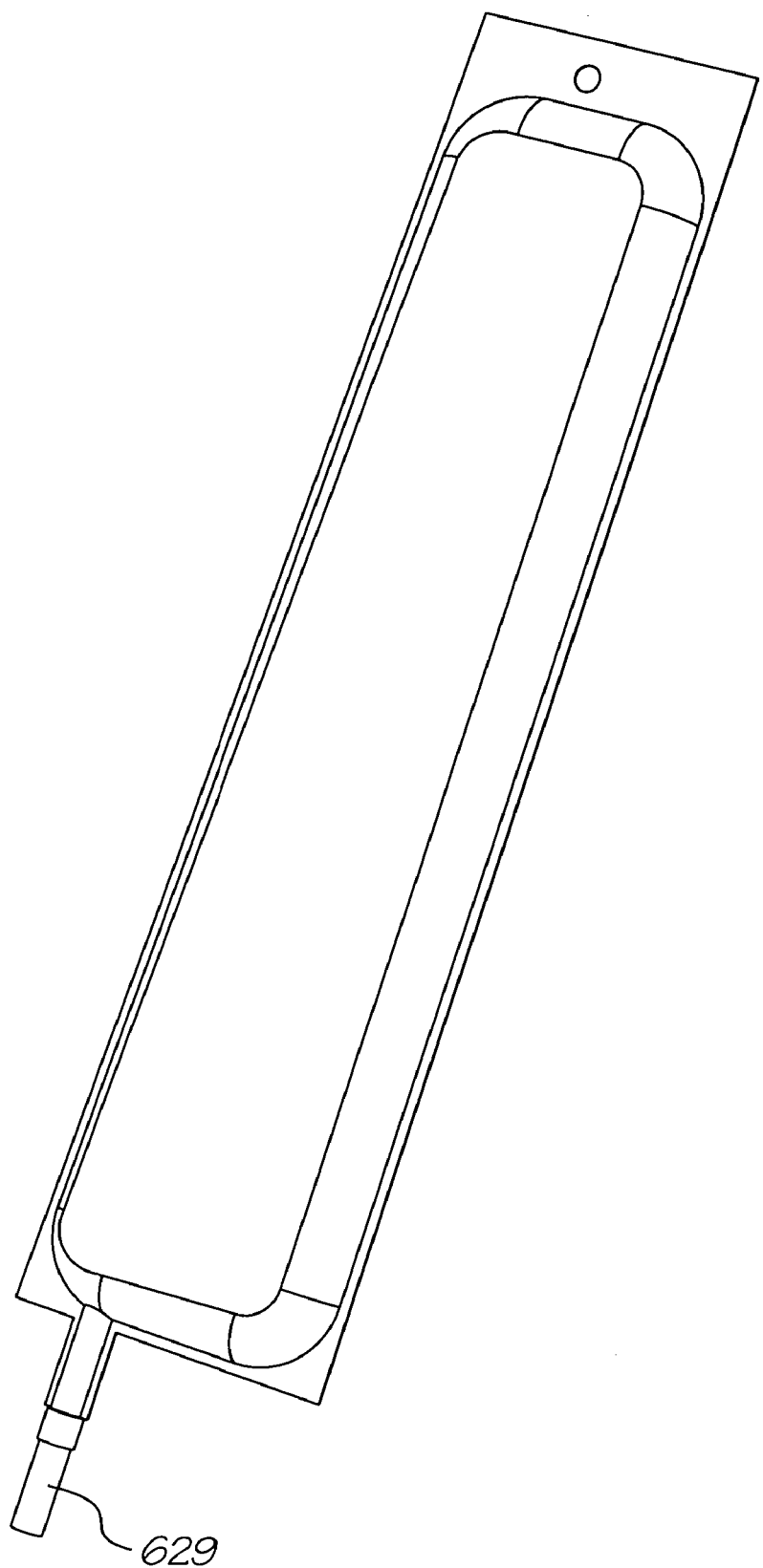
FIG. 6 shows a three-quarter view of a single ink bladder.
Figure 7A:
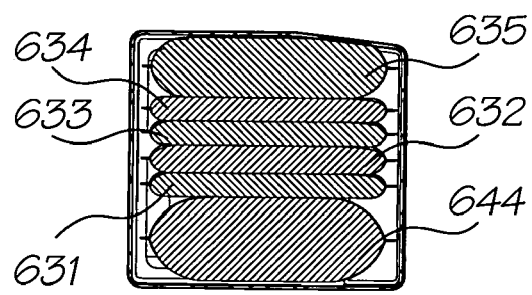
FIGS. 7a and 7b show lateral and longitudinal sections of the ink cartridge.
Figure 7B:
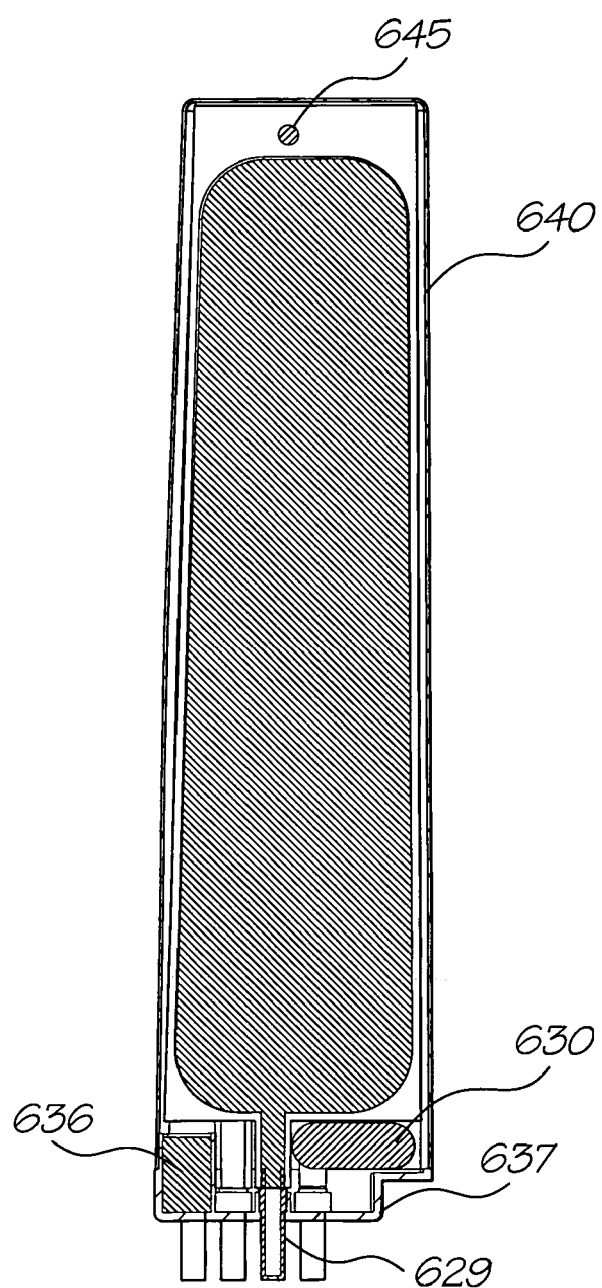
Figure 9:
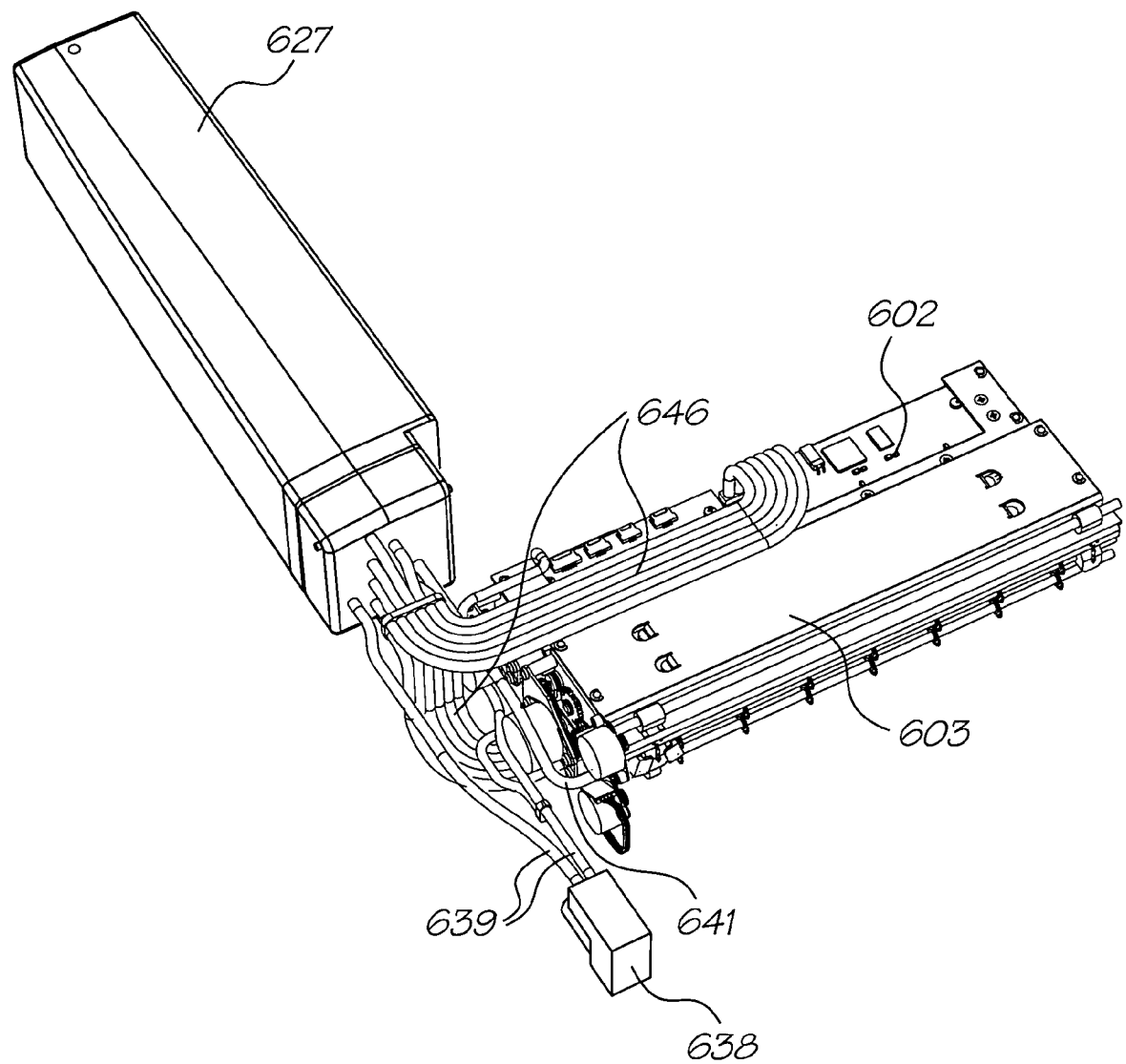
FIG. 9 shows the ink, air and adhesive supply hoses to the print engines.

FIG. 4, shows the complete assembly of the replaceable ink cartridge 627. It has bladders or chambers for storing fixative 644, adhesive 630, and cyan 631, magenta 632, yellow 633, black 634 and infrared 635 inks. The cartridge 627 also contains a micro air filter 636 in a base molding 637. As shown in FIG. 9, the micro air filter 636 interfaces with an air pump 638 inside the printer via a hose 639. This provides filtered air to the printheads 705 to prevent ingress of micro particles into the Memjet™ printheads 705 which may clog the nozzles. By incorporating the air filter 636 within the cartridge 627, the operational life of the filter is effectively linked to the life of the cartridge. This ensures that the filter is replaced together with the cartridge rather than relying on the user to clean or replace the filter at the required intervals. Furthermore, the adhesive and infrared ink are replenished together with the visible inks and air filter thereby reducing how frequently the printer operation is interrupted because of the depletion of a consumable material.

The cartridge 627 has a thin wall casing 640. The ink bladders 631 to 635 and fixitive bladder 644 are suspended within the casing by a pin 645 which hooks the cartridge together. The single glue bladder 630 is accommodated in the base molding 637. This is a fully recyclable product with a capacity for printing and gluing 3000 pages (1500 sheets).

The base molding 637 defines a plurality of vents 699 for receiving the connectors 629 and for equalizing air pressure inside and outside the casing 640.

Referring to FIGS. 2, 2a, 10, 11 and 19, the motorized media pick-up roller assembly 626 pushes the top sheet directly from the media tray 607 past a paper sensor (not shown) on the first print engine 602 into the duplexed Memjet™ printhead assembly.

Two Memjet™ print engines 602 and 603 are mounted in an opposing in-line sequential configuration along the straight paper path. The paper 604 is drawn into the first print engine 602 by integral, powered pick-up rollers 626. The position and size of the paper 604 is sensed and full bleed printing commences.

Fixative is printed simultaneously to aid drying in the shortest possible time.

As best shown in FIG. 2a, the Memjet™ print engines 602 and 603 include a rotary capping, blotting and platen device 669. The capping device seals the Memjet™ printheads 705 when not in use. It uncaps and rotates to produce an integral blotter, which is used for absorbing ink fired from the printheads 705 during routine printer startup maintenance. It simultaneously moves an internal capping device inside the Memjet™ printhead 705 that allows air to flow into the protective nozzle shield area. The third rotation of the device moves a platen surface into place, which supports one side of the sheet 604 during printing.

The paper exits the first Memjet™ print engine 602 through a set of powered exit spike wheels (aligned along the straight paper path), which acts against a rubberized roller. These spike wheels contact the 'wet' printed surface and continue to feed the sheet 604 into the second Memjet™ print engine 603.

This second print engine 603 is mounted the opposite way up to the first in order to print the underside of the sheet 604.

As shown in FIGS. 2, 2*a*, 9, 13 and 14, the paper 604 passes from the duplexed print engines 602 and 603, into the binder assembly 605. The printed page passes between a powered spike wheel axle 670 with a fibrous support roller and another movable axle with spike wheels and a momentary action glue wheel 673. The movable axle/glue assembly 673 is mounted to a metal support bracket and it is transported forward to interface with the powered axle 670 by action of a camshaft 642. A separate motor powers 675 this camshaft. Both motors 676 are controlled by the Memjet™ printheads.

The glue wheel assembly 673 consists of a partially hollow axle 679 with a rotating coupling 680 for the glue supply hose 641 from the ink cartridge 627. This axle 679 connects to a glue wheel 681, which absorbs adhesive by capillary action through radial holes. A molded housing surrounds the glue wheel 681, with an opening at the front. Pivoting side moldings 683 and sprung outer doors 684 are attached to the metal support bracket and hinge out sideways when the rest of the assembly 673 is thrust forward. This action exposes the glue wheel 681 through the front of the molded housing. Tension springs 685 close the assembly and effectively caps the glue wheel 681 during periods of inactivity.

As the sheet 604 passes into the glue wheel assembly 673, adhesive is applied to one vertical edge on the front side (apart from the first sheet of a document) as it is transported down into the binding assembly 605. It will be appreciated that this arrangement applies adhesive to each page during printing so that the paper movement through the printer is not interrupted or stopped at a separate gluing station. This increases the printer speed, however, it requires that the pages move through the printer in "portrait" configuration (that is, in a direction parallel to the long edges). This in turn requires the paper tray, binding station and collection station to be in a portrait configuration. This may make the overall length of the printer too great to conveniently fit into areas having limited space. In these situations, the media tray, binding station and collection station can be arranged in a "landscape" orientation (short sides parallel to paper movement) to shorten the length of the printer. However, the gluing assembly must still be able to apply glue along the long side of the pages. In this version of wallprinter (not shown), the adhesive is applied to the longitudinal edge of each page with a reciprocating glue strip.

Figure 13:
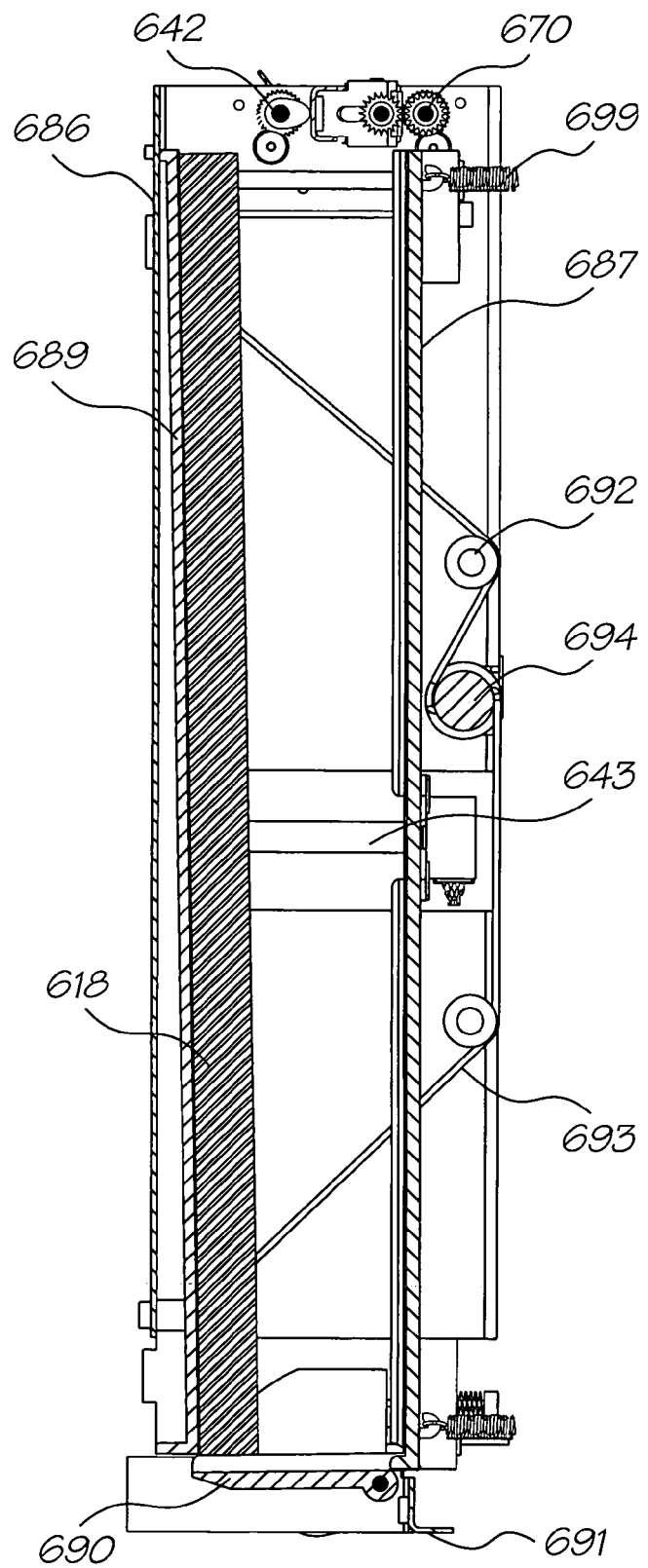
FIG. 13 shows a section through the binder assembly.

The "portrait" binder assembly 605 is best shown in FIG. 13. It has a metal support chassis 686, a sprung molded binding platen 687 that runs on four traverser rods, a molded angled platen 689 which supports the document 618 after the sheet 604 has been moved across, and an exit hatch 690 with support bracket 691. The printed page 604 is fed in until it rests on the exit hatch 690. The binding platen 687 is propelled forward at high speed via a looped system of wheels 692 and a sprung steel cable 693 that attaches to a powered cable winder shaft 694. As the cable winder shaft 694 is rotated, the cable loop 693 shortens and transports the binding platen 687 forward. This powered shaft 694 has a slip clutch mechanism and provides the necessary speed to push the sheet 604 forward onto the rear of a previous sheet, glue/bind it then return under the action of return springs 699 to the home position to accept the next printed sheet. A single operating cycle of the reciprocating platen takes less than 2 seconds.

The binding assembly 605 binds pages one by one into a bound document, thereby producing bound documents without significantly adding to the time taken to print the separate pages of the document. Furthermore it applies the adhesive directly prior to pressing it against the previous page. This is more effective than applying adhesive to the rear of each page and sequentially pressing each page to the subsequent page because any interruption in the printing process such as replenishing the paper supply may allow the adhesive applied to the last adhered page to deteriorate and become less effective.

The cable 693 is sprung to allow for positive pressure to be applied to the previous sheet to aid binding. Furthermore, the angled platen 689 is shallower at the top than at the base in order to support the document 618 in an over axis configuration.

A sensor (not shown) operatively connected to the control of the stepper motor, may be used to determine the position of the last page bound to the document to allow the platen to accurately adhere the next page to it.

A paper tapper 643 knocks the sheet 604 to one side of the binder 605 as it is transported across to the angled platen 689. The main PCB 612 controls motors 695, 696 and 697 for the cable winder shaft 694, the tapper 643 and the exit hatch 690 respectively.

When a document 618 is bound and finished, the powered exit hatch 690 opens. A tamper sensor (not shown) is provided to detect document jams or other interference acting to prevent the exit hatch 690 from closing. The tapper 643 also tap aligns the printed document 618 during ejection out of the binder 605 into the collection tray 619. Plastic foils 698 on the lower front molding 610 work together with the hatch 690 to direct the finished document 618 to the back of the collection tray 619 and feed any further documents into the tray without hitting existing ones. A plurality the flexible foils may be provided, each having different lengths to accommodate documents having different page sizes. The collection tray 619 is molded in clear plastic and pulls out of its socket under a certain loading. Access for removing documents is provided on three sides.

The invention has been described herein with reference to the specific examples only. Skilled workers in this field will readily recognize many variations and modifications, which do not depart from the spirit and scope of the broad inventive concept.

The invention claimed is:

1. An inkjet printer that comprises a chassis;

a pagewidth printhead assembly that is mounted on the chassis and defines a pagewidth printing zone through which sheets of print media are fed;

a media tray mounted on the chassis, upstream of the printhead assembly, the media tray including a guide arrangement in which sheets of print media can be retained;

an ink connector arrangement positioned on the media tray to permit an ink cartridge to be engaged with the printer adjacent the guide arrangement; and a feed means mounted on the chassis, interposed between the media tray and the printhead assembly and configured to feed sheets of print media through the printing zone;

wherein the media tray is pivotally mounted on the chassis between a closed, operative position and an open inoperative position to facilitate replacement of the ink cartridge and the sheets of print media.

2. An inkjet printer as claimed in claim 1, in which the pagewidth printhead assembly includes a pair of opposed print engines, one on either side of the printing zone so that a printing operation can be carried out on both sides of the sheets of print media.

3. An inkjet printer as claimed in claim 1, in which the media tray, the printhead assembly and the binding assembly are relatively positioned to define a substantially straight print media feed path when the media tray is in the operative position.

4. An inkjet printer as claimed in claim 1, in which the ink connector arrangement includes a series of ink connectors that are mounted on the media tray to engage complementary ink connectors of the ink cartridge and a series of hoses connected between respective ink connectors and the printhead assembly for feeding inks to the printhead assembly.

5. An inkjet printer as claimed in claim 1, in which an air conduit is arranged on the media tray to be in fluid communication with an air pump in the ink cartridge and connected to the printhead assembly to feed air to the printhead assembly.

6. An inkjet printer as claimed in claim 1, in which fixative and adhesive connectors are arranged on the media tray to engage complementary fixative and adhesive connectors of the ink cartridge, fixative and adhesive hoses being connected between the connectors and the printhead assembly.

* * * * *